US010911395B2

(12) United States Patent
Gibbs et al.

(10) Patent No.: US 10,911,395 B2
(45) Date of Patent: *Feb. 2, 2021

(54) TAILORING EFFECTIVE COMMUNICATION WITHIN COMMUNITIES

(71) Applicant: International Business Machines Corporation, Armonk, NY (US)

(72) Inventors: Nathaniel J. Gibbs, Iowa City, IA (US); Matthew M. Lobbes, Northlake, TX (US); Shelbee D. Smith-Eigenbrode, Thornton, CO (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,654

(22) Filed: Jun. 26, 2019

(65) Prior Publication Data

US 2019/0319912 A1  Oct. 17, 2019

Related U.S. Application Data

(63) Continuation of application No. 15/463,067, filed on Mar. 20, 2017, now Pat. No. 10,412,038.

(51) Int. Cl.
*G06F 15/16* (2006.01)
*H04L 12/58* (2006.01)

(52) U.S. Cl.
CPC .............. *H04L 51/34* (2013.01); *H04L 51/14* (2013.01); *H04L 51/32* (2013.01)

(58) Field of Classification Search
USPC ....... 709/203, 206, 217, 219, 223, 224, 226, 709/228, 230, 232, 238; 707/769, 798;
(Continued)

(56) References Cited

U.S. PATENT DOCUMENTS 6,904,408 B1   6/2005 McCarthy et al.
7,734,754 B2   6/2010 Dougherty et al.
(Continued)

FOREIGN PATENT DOCUMENTS

WO   2008077178 A1   7/2008

OTHER PUBLICATIONS

Appendix P, "List of IBM Patents or Patent Applications Treated as Related", Mar. 31, 2020, 2 pages.
(Continued)

*Primary Examiner* — Quang N Nguyen
(74) *Attorney, Agent, or Firm* — Michael P. O'Keefe; Madeline F. Schiesser; Keohane & D'Alessandro, PLLC

(57) ABSTRACT

Approaches presented herein enable tailoring messages to enhance sharing and resonance based on a community fingerprint and a key influencer. More specifically, a message to be directed to members of an online social community is received. Members of the social community who influence the social community and their likelihood to re-share messages are identified. A re-share fingerprint for the identified influencer is generated that maps the influencer's likelihood to re-share content. A communications fingerprint of the community is also created using an amalgamation of the communication patterns and styles of individual members of the community. The received message is optimized to most effectively target the message to the online social community and to solicit a desired response from the community based on the community communication fingerprint. The optimized message can then be forwarded to the online social community.

20 Claims, 8 Drawing Sheets

(58) Field of Classification Search
USPC .............................................. 705/38; 455/427
See application file for complete search history.

(56) References Cited

U.S. PATENT DOCUMENTS

| | | | |
|---|---|---|---|
| 8,351,925 B2* | 1/2013 | Feher | H04N 21/426 |
| | | | 455/427 |
| 8,838,435 B2 | 9/2014 | Talley et al. | |
| 9,020,839 B1 | 4/2015 | Mirchandani et al. | |
| 9,218,630 B2 | 12/2015 | Yang et al. | |
| 9,245,250 B2 | 1/2016 | Williams | |
| 9,875,286 B1 | 1/2018 | Lewis et al. | |
| 10,251,726 B2 | 4/2019 | Fisker et al. | |
| 10,257,126 B2 | 4/2019 | Gibbs et al. | |
| 10,314,088 B2* | 6/2019 | Pathuri | H04L 41/0803 |
| 2003/0142809 A1 | 7/2003 | Coffey | |
| 2004/0137416 A1 | 7/2004 | Ma et al. | |
| 2004/0268217 A1 | 12/2004 | Hughes et al. | |
| 2007/0022045 A1* | 1/2007 | Lapstun | G06Q 10/00 |
| | | | 705/38 |
| 2008/0139112 A1 | 6/2008 | Sampath et al. | |
| 2009/0012847 A1 | 1/2009 | Brooks et al. | |
| 2010/0057527 A1 | 3/2010 | Robert | |
| 2010/0088086 A1 | 4/2010 | Hughes et al. | |
| 2010/0179986 A1* | 7/2010 | Sebastian | H04L 65/60 |
| | | | 709/203 |
| 2010/0179987 A1* | 7/2010 | Sebastian | H04L 45/7453 |
| | | | 709/203 |
| 2010/0274815 A1* | 10/2010 | Vanasco | G06Q 10/107 |
| | | | 707/798 |
| 2011/0144971 A1 | 6/2011 | Danielson | |
| 2011/0289114 A1* | 11/2011 | Yu | H04N 21/4331 |
| | | | 707/769 |
| 2012/0041903 A1 | 2/2012 | Beilby et al. | |
| 2012/0158465 A1 | 6/2012 | Golembiewski | |
| 2012/0215853 A1* | 8/2012 | Sundaram | H04L 63/126 |
| | | | 709/206 |
| 2012/0254181 A1 | 10/2012 | Schofield et al. | |
| 2012/0329016 A1 | 12/2012 | Kapoor et al. | |
| 2013/0066716 A1 | 3/2013 | Chen et al. | |
| 2013/0097270 A1 | 4/2013 | Plotkin | |
| 2013/0304742 A1 | 11/2013 | Roman et al. | |
| 2013/0325755 A1 | 12/2013 | Arquette et al. | |
| 2014/0280623 A1 | 9/2014 | Duan | |
| 2015/0066814 A1 | 3/2015 | Allen et al. | |
| 2015/0149285 A1 | 5/2015 | Schroeter | |
| 2015/0161624 A1 | 6/2015 | Heath et al. | |
| 2015/0221336 A1 | 8/2015 | Deen et al. | |
| 2016/0042281 A1 | 2/2016 | Cunico et al. | |
| 2016/0042648 A1 | 2/2016 | Kothuri | |
| 2016/0048547 A1 | 2/2016 | Bastide et al. | |
| 2016/0050166 A1 | 2/2016 | Smith | |
| 2016/0337301 A1 | 11/2016 | Rollins et al. | |
| 2017/0180276 A1 | 6/2017 | Gershony et al. | |
| 2017/0201471 A1 | 7/2017 | Miklos et al. | |
| 2017/0222961 A1 | 8/2017 | Beach et al. | |
| 2017/0337199 A1 | 11/2017 | Kogan et al. | |
| 2018/0014071 A1* | 1/2018 | Richman | H04N 21/4622 |
| 2018/0041451 A1 | 2/2018 | Gibbs et al. | |
| 2018/0089310 A1 | 3/2018 | Barsness et al. | |
| 2018/0270186 A1 | 9/2018 | Gibbs et al. | |
| 2019/0199519 A1* | 6/2019 | Goyal | G06F 16/215 |
| 2020/0007551 A1* | 1/2020 | Valente | H04L 63/104 |

OTHER PUBLICATIONS

Anonymously, "Method and Apparatus to Determine Extent of Social Collaboration of Communities and Members", IP.com No. IPCOM000231480D, Dated Oct. 1, 2013, 5 pages.
Anonymously, "Method of Social Influence Service" IP.com No. IPCOM000243450D, Dated Sep. 22, 2015, 3 pages.
Katherine Karp, "New research: The value of influencers on Twitter", blog.twitter.com, Dated May 10, 2016, 6 pages.
Unknown, "The Biggest Problem With Micro-Influencers (and How to Solve It)", Adweek.com, Dated May 17, 2016, 10 pages.
Barry Levine, "Epsilon and Lithium/Klout get together so social can help target email", venturebeat.com, Dated Aug. 11, 2015, 34 pages.
Nguyen, Quang N., U.S. Appl. No. 15/463,067, Notice of Allowance and Fees Due dated May 3, 2019, END920160690US1, 18 pgs.
Jonathan A. Bui, USPTO Office Action, U.S. Appl. No. 15/228,194, Notification dated Jun. 28, 2018, 10 pages.
Jonathan A. Bui, USPTO Notice of Allowance, U.S. Appl. No. 15/228,194, dated Nov. 16, 2018, 8 pages.
Author Unknown, "Dealing With Angry People", http://www.mindtools.com/pages/article/dealing-with-angry-people.htm, Mar. 3, 2017, 7 pages.
Judith Orloff, "4 Tips to Deal With Frustrating People", https://www.psychologytoday.com/blog/emotional-freedom/201202/4-tips-deal-frustrating-people, Feb. 29, 2012, 4 pages.

* cited by examiner

| COMMUNITY ANALYTICS & INSIGHTS TO CREATE "COMMUNITY FINGERPRINT" |
|---|
| ⇒ 30% OF MEMBERS ARE CURRENTLY POSTING 90% OF THE CONTENT<br>⇒ 11,764 MEMBERS TOTAL |
| OF THE 30% MEMBERS ACTIVE:<br>    60% WORK FOR COMPANIES KNOWN TO HAVE HAD PARTNERSHIPS WITH ABC INC.<br>    10% WORK FOR ABC INC. |
| ⇒ 90% OF POSTS BY JOHN DOE ELICIT A HIGH DEGREE OF RESONANCE VIA 'LIKES' AND 'SHARES'<br>⇒ 80% OF POSTS BY JOHN DOE ARE RE-SHARES ABOUT NEW DEVOPS TOOLS, UPCOMING CONFERENCES, & TWEETS MENTIONING HIS BOOKS |
| ⇒ 70% OF POSTS ABOUT IMMUTABLE INFRASTRUCTURE GENERATE COMMENTS WITH POSITIVE SENTIMENT |
| ⇒ 30% OF POSTS ABOUT ABC TOOLING GET LIKED, CLICKED AND RESHARED |
| ⇒ TOP 5 TWITTER INFLUENCERS (MOST FOLLOWERS) IN THIS GROUP, TEND TO POST NEGATIVE COMMENTS ABOUT THE FOLLOWING COMPANIES & TECHNOLOGIES: WECLOUD, TOOL1, TOOL2 |
| ⇒ TOP 5 TWITTER INFLUENCERS (MOST FOLLOWERS) IN THIS GROUP, TEND TO POST POSITIVE COMMENTS ABOUT THE FOLLOWING COMPANIES & TECHNOLOGIES: THATGUYSCLOUD, TOOL3, TOOL6 |

FIG. 7

TAILORING EFFECTIVE COMMUNICATION WITHIN COMMUNITIES

The present patent document is a continuation of U.S. patent application Ser. No. 15/463,067, filed Mar. 20, 2017, entitled "TAILORING EFFECTIVE COMMUNICATION WITHIN COMMUNITIES", the disclosure of which is incorporated herein by reference.

TECHNICAL FIELD

This invention relates generally to generating community customized tailored communications and, more specifically, to tailoring messages to members of a community based on a communications fingerprint and key influencers within that community.

BACKGROUND

Recent years have seen the rise of computer-mediated technologies that allow the creating and sharing of information, ideas, career interests, and other forms of expression via virtual communities and networks, such as social media websites like Facebook, Twitter, and LinkedIn (Facebook is a registered trademark of Facebook Inc., Twitter is a registered trademark of Twitter Inc., LinkedIn is a registered trademark of LinkedIn Corporation). Many of these virtual communities and networks allow users to post textual statements, pictures, videos, and links to other websites, such as news articles. These posts can be re-shared, re-tweeted, and so forth, by other users of the virtual community. Some posts may become very popular, receiving a high number of likes or similar endorsements from other users and being re-shared many times. Such posts are sometimes described as "going viral."

The popularity of virtual communities and networks has also resulted in advertisers and other parties using these platforms to disseminate related content and other information to individual users. Algorithms to determine what content would be of most interest to an individual user and to select content to present to that user can be used to direct or target messages to a particular user most likely to positively respond to the messages. Directed or targeted messages can be used for advertisements, news stories, or any other content that a party wants to push to a user of the virtual community. Often, such parties desire to maximize user views or "clicks" on their content.

SUMMARY

Approaches presented herein enable tailoring messages to enhance sharing and resonance based on a community fingerprint and a key influencer. More specifically, a message to be directed to members of an online social community is received. Members of the social community who influence the social community and their likelihood to re-share messages are identified. A re-share fingerprint for the identified influencer is generated that maps the influencer's likelihood to re-share content. A communications fingerprint of the community is also created using an amalgamation of the communication patterns and styles of individual members of the community. The received message is optimized to most effectively target the message to the online social community and to solicit a desired response from the community based on the community communication fingerprint. The optimized message can then be forwarded to the online social community.

One aspect of the present invention includes a computer-implemented method for tailoring messages to enhance sharing and resonance based on a community fingerprint and a key influencer, the computer-implemented method comprising: receiving a message directed to members of an online community; identifying a set of key influencers based on a node analysis of a plurality of messages between the members of the online community, the set of key influencers being members of the online community; generating a set of re-share fingerprints for the set of identified key influencers; optimizing the received message for at least a subset of the community that is influenced by at least one key influencer of the set of identified key influencers based on a community communication fingerprint comprising a weighted average of the re-share fingerprint of the at least one key influencer and re-share fingerprints of other members of the online community; and forwarding the optimized message to the at least a subset.

Another aspect of the present invention includes a computer system for tailoring messages to enhance sharing and resonance based on a community fingerprint and a key influencer, the computer system comprising: a memory medium comprising program instructions; a bus coupled to the memory medium; and a processor, for executing the program instructions, coupled to a message tailoring tool via the bus that when executing the program instructions causes the system to: receive a message directed to members of an online community; identify a set of key influencers based on a node analysis of a plurality of messages between the members of the online community, the set of key influencers being members of the online community; generate a set of re-share fingerprints for the set of identified key influencers; optimize the received message for at least a subset of the community that is influenced by at least one key influencer of the set of identified key influencers based on a community communication fingerprint comprising a weighted average of the re-share fingerprint of the at least one key influencer and re-share fingerprints of other members of the online community; and forward the optimized message to the at least a subset.

Yet another aspect of the present invention includes a computer program product for tailoring messages to enhance sharing and resonance based on a community fingerprint and a key influencer, the computer program product comprising a computer readable storage device, and program instructions stored on the computer readable storage device, to: receive a message directed to members of an online community; identify a set of key influencers based on a node analysis of a plurality of messages between the members of the online community, the set of key influencers being members of the online community; generate a set of re-share fingerprints for the set of identified key influencers; optimize the received message for at least a subset of the community that is influenced by at least one key influencer of the set of identified key influencers based on a community communication fingerprint comprising a weighted average of the re-share fingerprint of the at least one key influencer and re-share fingerprints of other members of the online community; and forward the optimized message to the at least a subset.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 7 shows an illustrative example of tailoring messages based on a community fingerprint and key influencers to enhance sharing and resonance of the message according to illustrative embodiments.

Figure 1:
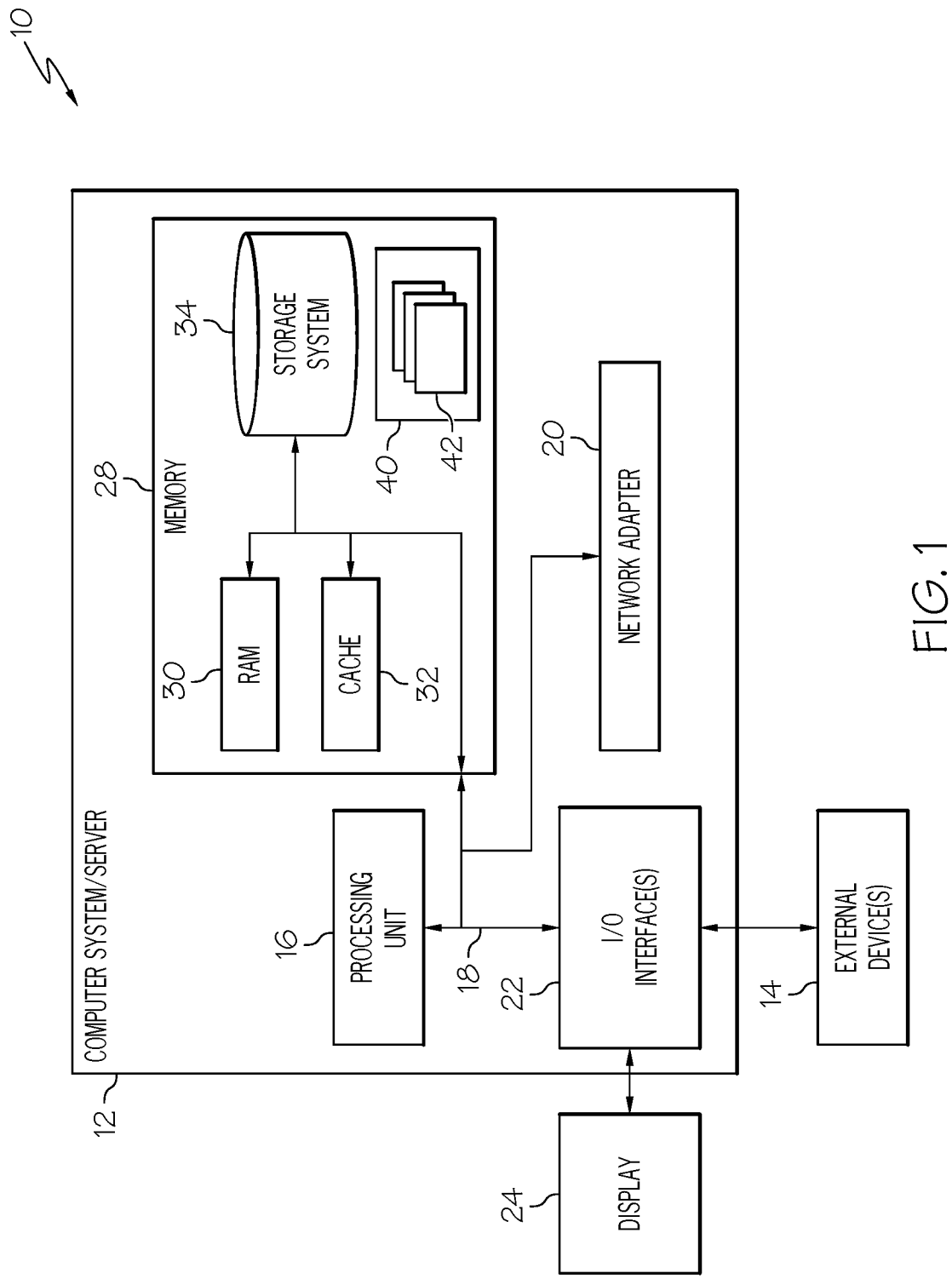
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for tailoring messages to enhance sharing and resonance based on a community fingerprint and a key influencer. More specifically, a message to be directed to members of an online social community is received. Members of the social community who influence the social community and their likelihood to re-share messages are identified. A re-share fingerprint for the identified influencer is generated that maps the influencer's likelihood to re-share content. A communications fingerprint of the community is also created using an amalgamation of the communication patterns and styles of individual members of the community. The received message is optimized to most effectively target the message to the online social community and to solicit a desired response from the community based on the community communication fingerprint. The optimized message can then be forwarded to the online social community.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node for tailoring messages based on a community fingerprint and key influencers to enhance sharing and resonance of the message is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Further, referring to FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for tailoring messages based on a community fingerprint and key influencers to enhance sharing and resonance of the message, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
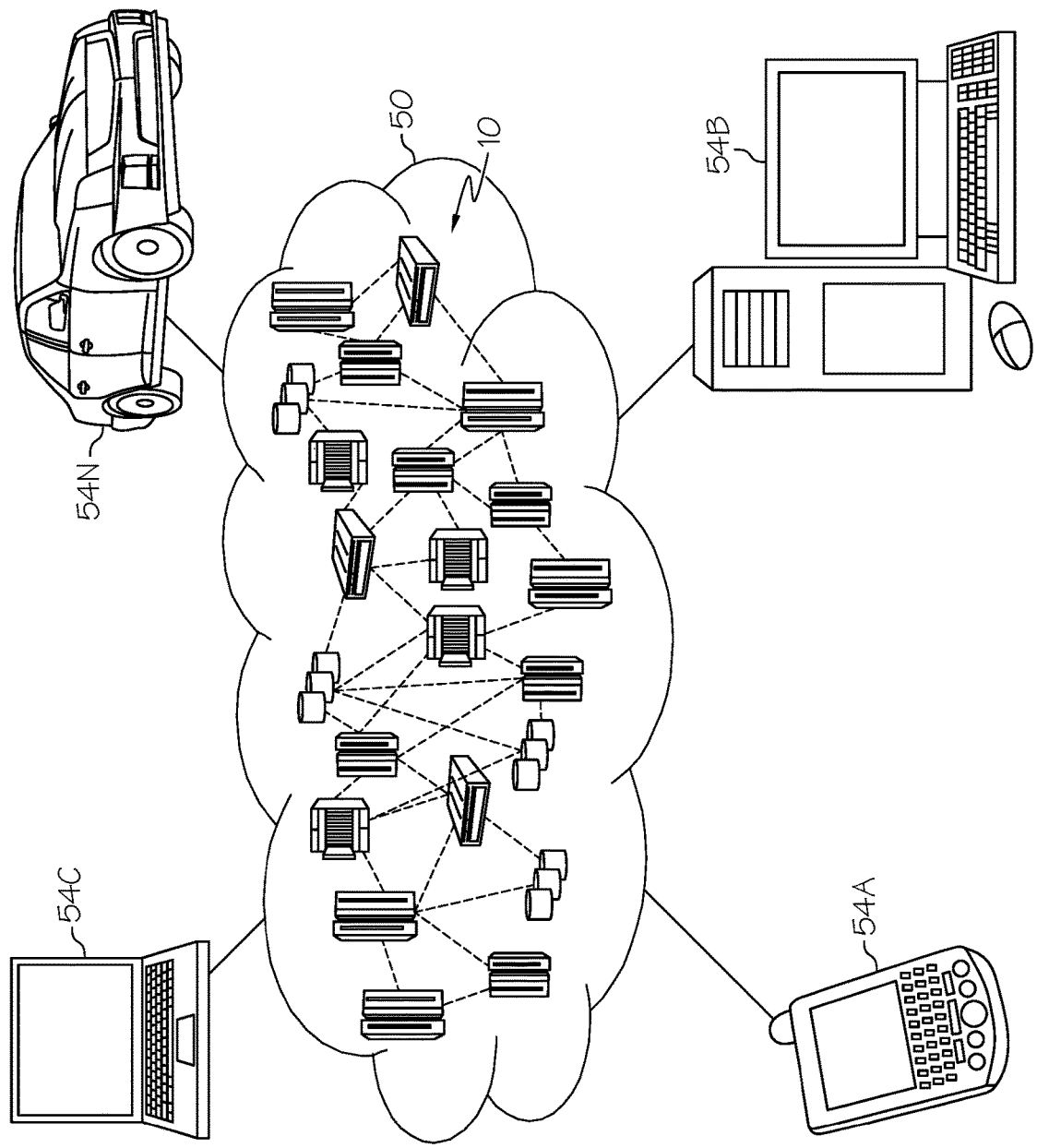
FIG. 2 depicts a cloud computing environment according to illustrative embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
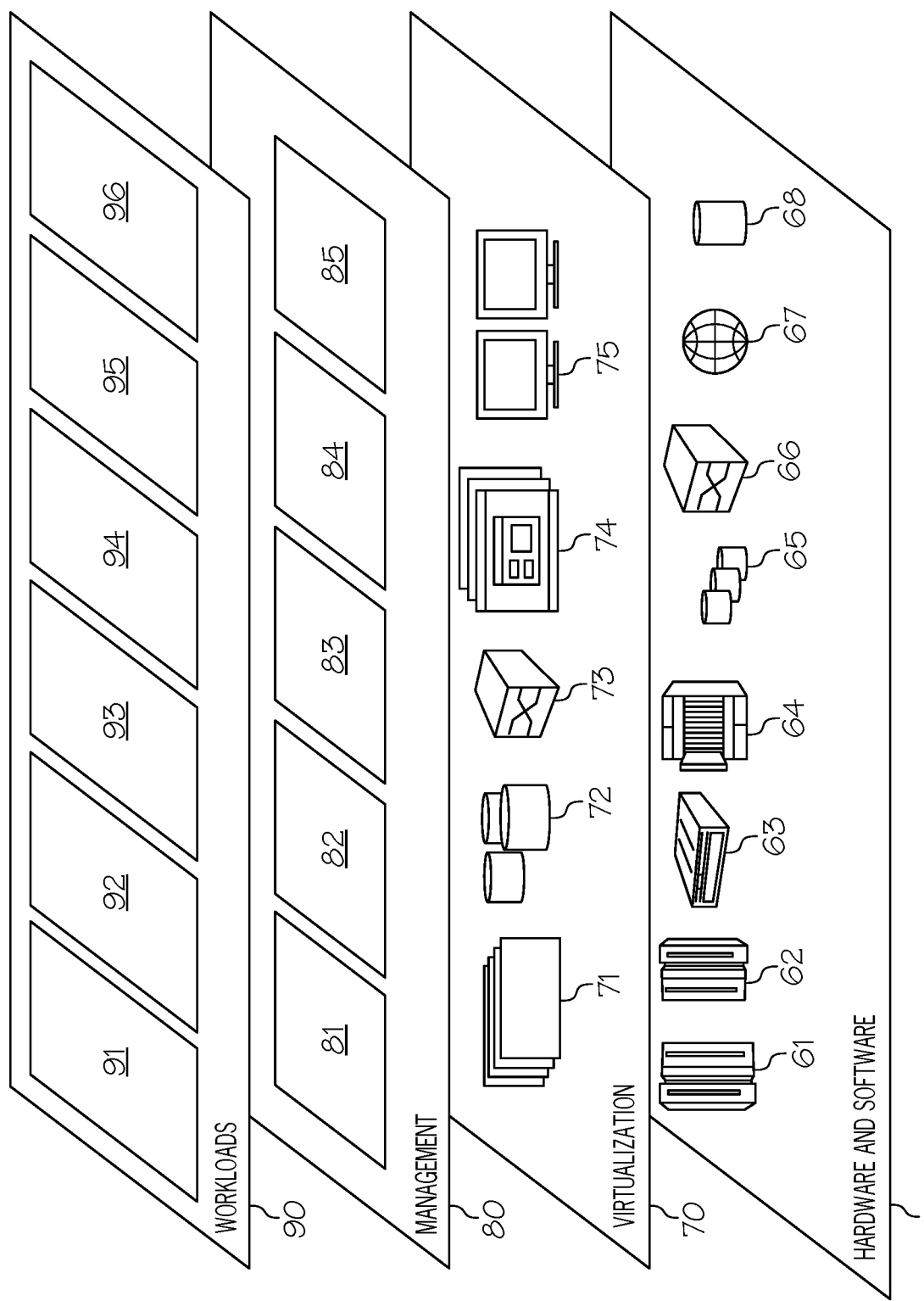
FIG. 3 depicts abstraction model layers according to illustrative embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Further shown in management layer is message tailoring 85, which represents the functionality that is provided under the embodiments of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communications processing 96.

As mentioned above, all of the foregoing examples described with respect to FIG. 3 are illustrative only, and the invention is not limited to these examples. It is understood that all functions of the present invention as described herein typically may be performed by the message tailoring functionality 85 (of management layer 80, which can be tangibly embodied as modules of program code 42 of program/utility 40 (FIG. 1). However, this need not be the case. Rather, the functionality recited herein could be carried out/implemented and/or enabled by any of the layers 60, 70, 80, or 90 shown in FIG. 3.

It is reiterated that although this disclosure includes a detailed description on cloud computing, implementation of the teachings recited herein are not limited to a cloud computing environment. Rather, some embodiments of the present invention are intended to be implemented with any type of networked computing environment now known or later developed.

The inventors of the present invention have found that in cases where communications or other messages are targeted to a group of people or a community, these communications are sent based on general interests of the group overall, gathered from various sources about the members of the group, such as social media, search history, known associations, etc. While there are benefits in targeting communications to groups based on generic categories of interest, this tends to result in communications that cater to lowest common denominators within the group and that are less likely to be noticed or shared by the group overall.

Accordingly, the inventors of the present invention have discovered that targeted communications can be made more effective by basing the communications, not only on a known set of interests of the target group, but also on key influencers within that group. Furthermore, the inventors of the present invention have discovered that targeted communications could also be made more effective by optimizing the communications based on a signature of messages previously proven to resonate best with a particular group or community. Therefore, the present invention offers a solution to current deficiencies in the art by creating and continuously refining a set of community fingerprints centered around key influencers in the community. This solution, based not only on general interests in a topic, product, or message, analyzes message resonance, key community influencers, and engagement level among groups with similar interests to create a community fingerprint This community fingerprint can be used to identify features of successful communications within a community. By identifying and targeting key influencers within a given community the likelihood increases of key influencers sharing a message within their communities. Furthermore, by using this information to tailor a message, not only are key influencers more likely to re-share that message, but the message is more likely to resonate within the community.

Advantages of the present invention include, but are not limited to, more effectively identifying how a specific group of people prefer to communicate and what type of communication they are most responsive to for a desired reaction. This allows advertisers and other parties to prepare content that can best permeate the group through inter-group sharing. By basing presentation of content on the communication style of a group at large, it is possible to tailor content only once, as opposed to many times for each individual. This makes the process of maximizing the number of users who see and share content more efficient, as it allows optimal group permeation with minimal content adjustment. Therefore, a computer performing embodiments of the present invention requires less processing time and fewer resources.

Computerized applications of the present invention include, but are not limited to, modeling communication patterns within a group, deriving analytics and insights from the modeled communication patterns, designing communications to match a pattern of group communications, and developing strategies for deploying informative messages within a group based on the group communication pattern.

It should be understood that, while there are currently techniques in the existing art for generally targeting communication to groups with similar interests and gauging communication effectiveness which may enable certain features of the present invention, these techniques will not be discussed in detail as they will generally be understood by a person trained in the art and therefore do not necessitate an in-depth discussion here.

In the context of embodiments of the present invention, it should be understood that the words "community" and "group" may be used interchangeably and can include any number of groups with a common feature such as, but not limited to: social network groups, social network lists, blog members, followers of public figures, online topic driven communities, etc.

Figure 4:
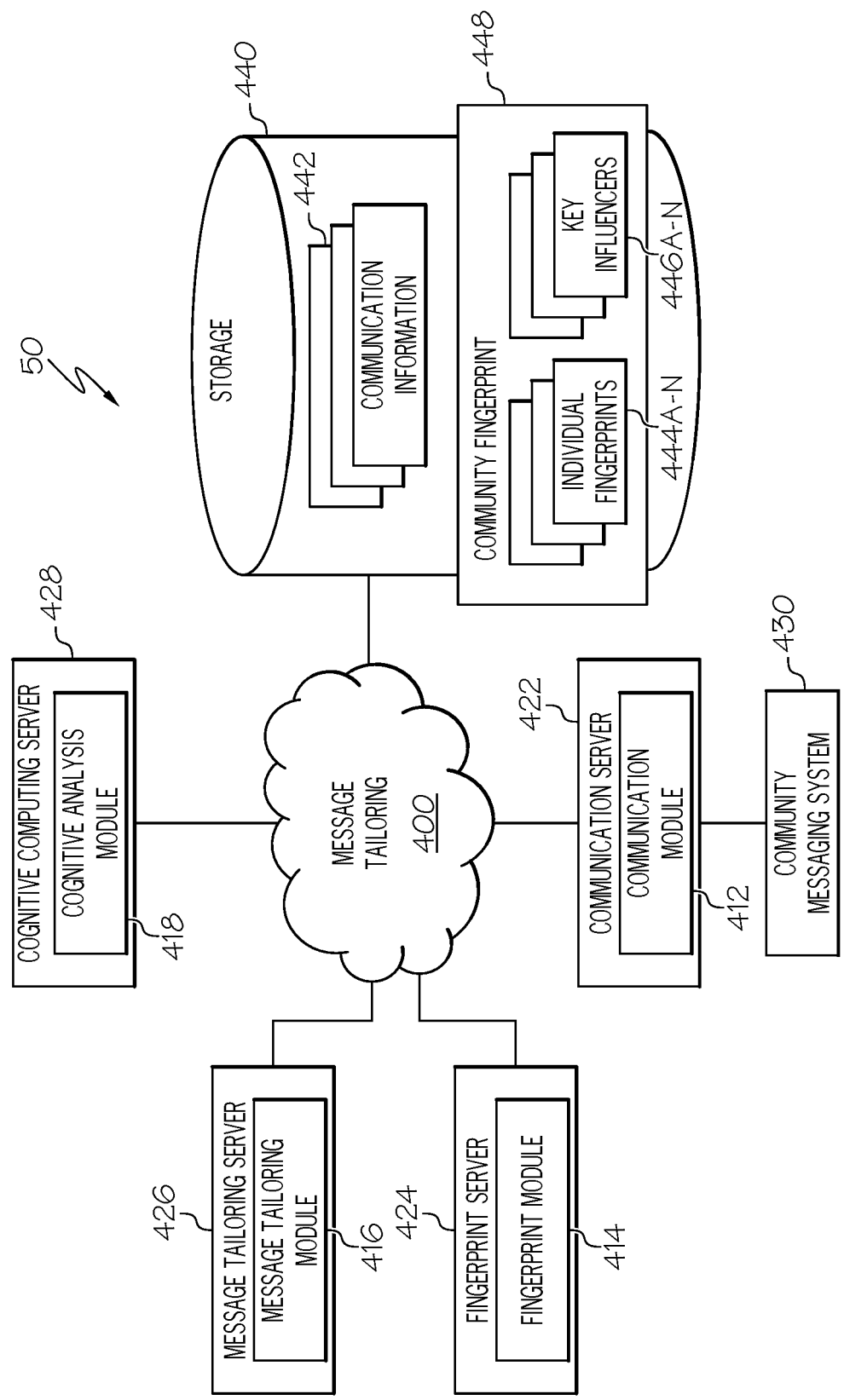
FIG. 4 shows a more detailed system architecture for tailoring messages based on a community fingerprint and key influencers to enhance sharing and resonance of the message according to illustrative embodiments.

Referring now to FIG. 4, a more detailed system architecture for tailoring messages based on a community fingerprint and key influencers to enhance sharing and resonance of the message according to illustrative embodiments is shown. Cloud computing environment 50 (FIG. 2) can contain a message tailoring cloud 400 in communication with computer systems/servers 12 (FIG. 1) having modules containing program instructions for carrying out embodiments of the present invention. In some embodiments, the modules containing program instructions for carrying out embodiments of the present invention can be program/utility 40 of FIG. 1. These modules can include a communication module 412 on a communication server 422, which can be in communication with a community messaging system 430 used by members of a community, a fingerprint module 414 on a fingerprint server 424, a message tailoring module 416 on a message tailoring server 426, and a cognitive analysis module 418 on a cognitive computing server 428. These modules can be in communication with a data store 440 through message tailoring cloud 400.

Community messaging system 430 can be any system, platform, network, etc., in which users may communicate with one another, form connections with one another, and form groups of individuals with a particular interest. Community messaging system 430 can include a platform on which users can exchange messages and/or other communications, including written messages, pictures, video, audio, and/or content or links from other websites or online services, such as news. Examples include, but are not limited to, social media websites like Facebook, Twitter, and LinkedIn.

Data store 440 can be any storage or memory in communication with messaging tailoring cloud 400. For example, data store 440 can be one or more cloud storage resources or one or more storage servers. In any case, data store 440 can store information and analytics gathered by the modules. For instance, data store 440 can hold communication information 442 gathered by communication module 412 from community messaging system 430.

It should be understood that, although message tailoring cloud 400 is shown in FIG. 4 as having components and modules across different servers, the message tailoring functionality of message tailoring cloud 400 can also reside on a same server or computer system 12 as a message tailoring tool. The architecture shown in FIG. 4 is not intended to be limiting and merely shows one possible architecture of embodiments of the present invention.

Figure 5:
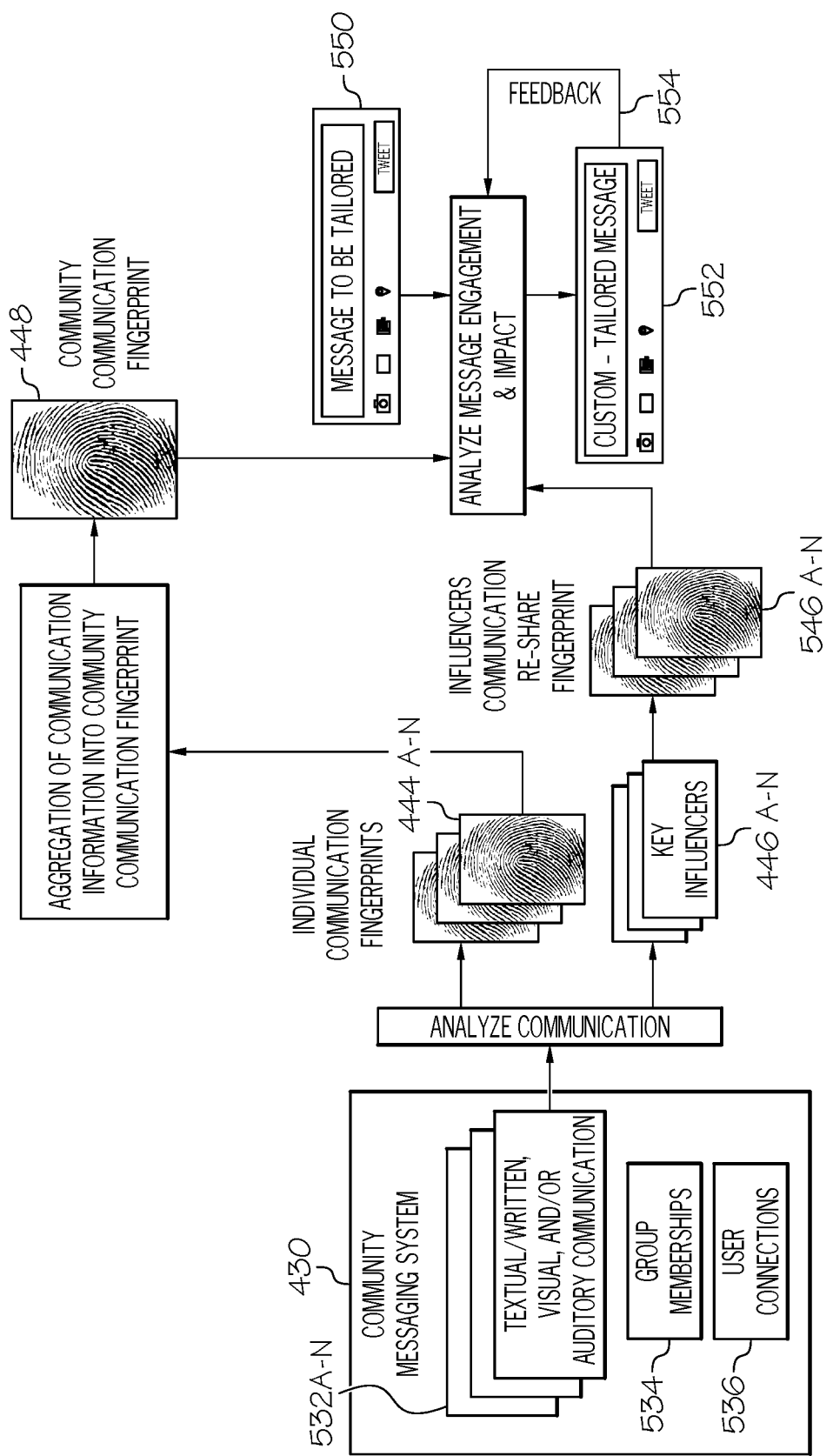
FIG. 5 shows implementations for tailoring messages based on a community fingerprint and key influencers to enhance sharing and resonance of the message according to illustrative embodiments.

Referring now to FIG. 5, in conjunction with FIG. 4, implementations of embodiments of the present invention will be discussed in further detail. Embodiments can be used to tailor a message or other communication to increase resonance and reach of the message or communication within a community of people by identifying community influencers and their likelihood to re-share messages and utilizing identified communication patterns for a collective group of people with similar interests (e.g., a LinkedIn group, an online community, a Twitter following, a blog, etc.) to create an aggregated communication fingerprint for that community/group. Accordingly, embodiments of the present invention can be utilized to effectively target communication to solicit a desired response.

Communication module 412 can gather information on communication and messages 532A-N between users or posted by users in an online community, network, or platform that has a plurality of users, such as community messaging system 430 (e.g., LinkedIn, Twitter, Facebook). Communication information and messages 532A-N can include text and/or written communication, such as, but not limited to, social media interactions among members of a group or other connected users, publications or blog posts, and online postings (e.g., reviews, comments, discussions). Communication information and messages 532A-N can further include visual communication, such as, but not limited to, Facetime, Google+ Hangouts, iChat, and video blogs (Facetime and iChat are registered trademarks of Apple Inc., Google+ Hangouts is a registered trademark of Google Inc.). Communication information and messages 532A-N can further include auditory and recorded communication, such as, but not limited to, meeting recordings, panel recordings, interview recordings, podcast, and video blog audio. In particular, information showing which messages 532A-N receive the most views, which messages 532A-N are most frequently shared, who is most likely to share and who is most likely to view those messages, and the characteristics (e.g., tone) of those messages, is gathered.

Communication module 412 can further gather information about communities 534 and other users 536 with which users of community messaging system 430 are associated. For example, communication module 412 can find social groups, common-interest groups, professional groups, etc., to which a user belongs or is a member. In another example, communication module 412 can also gather information about a user's friends, connections, or users otherwise linked to the user. This information can be used to identify communities or groups, whether a specific group joined by users or a constructive group construed by close association and messaging between a plurality of users. Methods of determining groups and communities online are generally known in the art and therefore, in the interest of brevity, will not be described in further detail here.

This information can be stored as communication information 442 in storage 440 connected to message tailoring cloud 400. In some embodiments, storage of communication information 442 can be temporary and used to hold information while a communication fingerprint of an individual or of a community is being constructed.

Fingerprint module 414 can analyze (e.g., by using a semantic analysis to produce analytics and insights) this gathered communication and messaging system information to create a set of unique individual communication fingerprints 444A-N for a set of users. This can be accomplished, for example, by analyzing typical communication patterns based on, but not limited to, communication information and messages 532A-N, relationships 536 between users, and groups associated with the user, for each user to build a fingerprint corresponding to him or her. Fingerprints can include, but are not limited to, individual preferred communication style (e.g., type of communication, emotional content), typical response patterns (e.g., responds negatively to specific wording or communication styles), and preferred response communication style (e.g., emotional content, humor).

Figure 6:
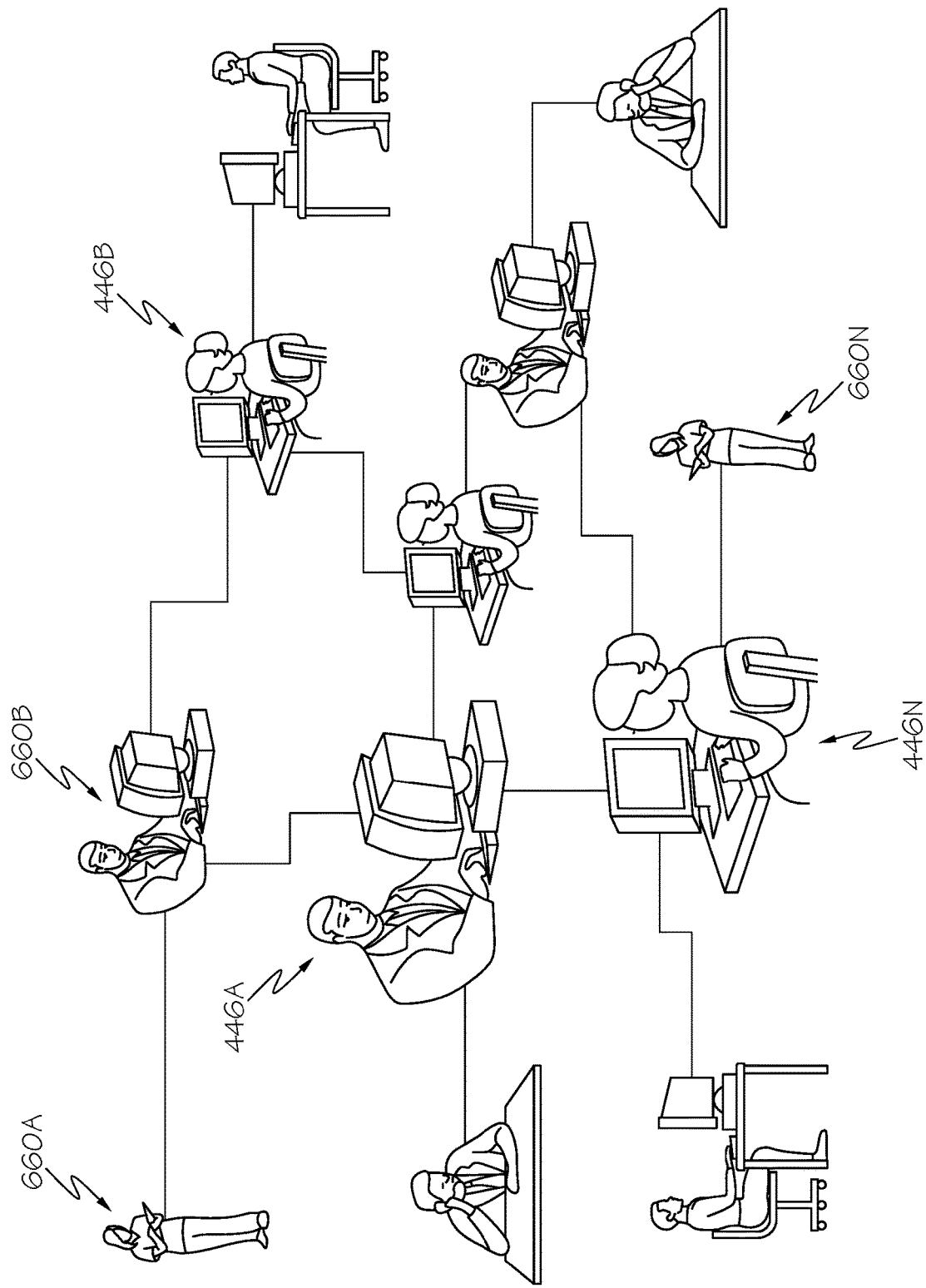
FIG. 6 shows network mapping to identify communication nodes corresponding with key influencers according to illustrative embodiments.

Referring now to FIG. 6 in addition to FIG. 4 and FIG. 5, communication module 412 can further obtain information about which users of users 660A-N appear to drive communication the most and influence overall communication from communication messaging system 430. Users who influence group discussions often have content they share re-shared by other users 660A-N, have a high frequency or number of views and/or posts, and/or express attitudes and opinions subsequently adopted by other members of a group, etc., can be labeled as key influences 446A-N. This can be accomplished, for example, by communication module 412 noting which users have a high number of message re-shares or whose sentiments about certain content are most shared by a community.

Techniques for identifying influencers of a group can include, for example, network mapping to identify nodes corresponding with users through which and/or at which significant numbers of communications pass or are generated, respectively, which are subsequently viewed and/or re-shared. This network mapping can include identifying topics, subjects, or other items of conversation between users 660A-N in a community, and tracing (e.g., based on time stamps) pathways of those conversations back to an originator. The network mapping can further include measuring quantities of messages per each user and what percentage or fraction of those messages receive responses or shares by other members of the community. Once several interactions have been mapped, a map with nodes or hubs corresponding to key influencers 446A-N, as shown in FIG. 6, can emerge. This map can indicate which of users 660A-N have the most links to conversations among users in the community and/or are responded to or re-shared the most. For example, as shown in FIG. 6, key influencer 446A is identified as a key influencer because his posts are re-shared more often than those of any other user and many discussions among the community were initiated by key influencer 446A. This gives key influencer 446A influence over four other users 660A-N, including three other influencers. By comparison, while key influencer 446B is also identified as a key influencer, influencer 446B is revealed by the network mapping to have less influence than key influencer 446A because fewer of her messages are re-shared or the basis of community discussion. By further comparison, user 660A is not identified as a key influencer because she does not often post content and her posts are only infrequently shared. Accordingly, the network mapping shows that user 660A does not have influence over any other users.

Referring back to FIG. 4 and FIG. 5, fingerprint module 414 can identify re-share fingerprint 546N of a key influencer 446N. Re-share fingerprint 546A-N can include multiple sources of fingerprint data specific to the influencer, such as pattern of communication style (e.g., short or longer, time and frequency of most messages, type or preferred method/platform), sentiment of communication (e.g., positive sentiment in 95% of message content from key influencer), topics of interest (e.g., employment, hobbies, news, other fields of interest), and so forth. More specifically, re-share fingerprints 546A-N can contain such features of content that was not created by key influencer 446N but that key influencer 446N chose to re-share. As will be discussed further below, re-share fingerprint 546N of key influencer 446N can be used as a parameter to create a message that mimics the re-share pattern of key influencer 446N and therefore will be more likely to be re-shared by key influencer 446N.

Fingerprint module 414 can further aggregate typical communication patterns across members of the group or community based on, but not limited to, individual communication fingerprints 444A-N, communication information 532A-N, group memberships 534, connections 536, and/or key influencers 446A-N to create a community communication fingerprint 448 for that group or community. Community communication fingerprint 448 can contain a mapping of communication features, such as communication styles, that are proven to have optimum resonance within the community as a whole. For example, community communication fingerprint 448 can show communication sentiment and style within the community (e.g., a group may prefer informal conversational tones over formal). Community communication fingerprint 448 can also show what types of message content have the most impact on a group (e.g., group is actively discussing and sharing content related to a sports team). Community communication fingerprint 448 can further be shaped by, for example, key influencers within a group and their individual re-share fingerprint, a group-preferred communication style, typical response patterns, and collective preferred response style.

Community communication fingerprint 448 can be updated (e.g., continuously, periodically). This updating can be responsive to changes in communication style of individual users and/or key influencers and therefore the dynamic of the community as a whole, changes in group membership, etc. Updates to community communication fingerprint 448 can also be based on feedback from messages previously tailored to meet community communication fingerprint 448 and success/failure, dissemination, and resonance of those previous messages. For example, a message that had lower resonance than expected can cause a current community communication fingerprint 448 to be marked stale or replaced with a new community communication fingerprint 448.

Message tailoring module 416 can use community communication fingerprint 448 and re-share fingerprint 546N of a key influencer 446N to adjust a message to be tailored 550 to a custom-tailored message 552. A user or other party may submit a message to be tailored 550 that the user or other party would like to optimize for maximum resonation and dissemination among a particular community or group. Message tailoring module 416 can rewrite message to be tailored 550 to match community communication fingerprint 448 and re-share fingerprint 546N of a key influencer 446N associated with that community or group. Custom-tailored message 552 can have a number of potential applications, such as community-customized marketing and sales, political, and professional communications. Custom-tailored message 552 can also increase an influence of a group or community by helping communications within that community to be further disseminated.

For example, if community communication fingerprint 448 indicates that users of the community respond well to short, positive messages and if re-share fingerprint 546N of a key influencer 446N indicates that key influencer 446N is more likely to share humorous messages, then message tailoring module 416 can rewrite message to be tailored 550 to be short, humorous, and positive, as custom-tailored message 552. This increases a likelihood that custom-tailored message 552 will be re-shared by key influencer 446N and that users of the community will view and respond or be influenced by the message.

Furthermore, message tailoring module 416 can rewrite message 550 to solicit a desired response based on community communication fingerprint 448 and re-share fingerprint 546N for key influencer 446N. For example, community communication fingerprint 448 and/or re-share fingerprint 546N might indicate that messages with a light, humorous tone are more likely to cause a discussion among users about the subject of that message or to cause users to have a positive view of the subject of that message, as compared with long messages with a serious tone. Therefore, when a party, such as an advertiser, submits a message to be tailored 550 to message tailoring cloud 400 and indicates that he or she would like users to form a positive opinion of the advertisement, message tailoring module 416 can rewrite the message with a humorous, succinct, and light tone.

Still further, message tailoring module 416 can suggest several re-crafted messages based on community communication fingerprint 448 and re-share fingerprint 546N for key influencer 446N. These can be presented to a user in a ranked list of tailored messages 552 most likely to be re-shared, read, liked, and/or any other indicator of resonance within the community. In some embodiments, a user, such as an advertiser, can select which of the several re-crafted messages the user would like presented to the community. In further embodiments, message tailoring module 416 can recommend multiple messages, each targeted at a different influencer within the community. In other embodiments, message tailoring module 416 can automatically select which of the several re-crafted messages to present to the community. This may be accomplished, for example, based on the ranked list or other instructions for automatic selection.

In still further embodiments, cognitive analysis module 418 can provide learning capabilities to message tailoring cloud 400. Cognitive analysis module 418 can use feedback 554 to continuously refine community communication fingerprint 448 as well as corresponding influencers communication re-share fingerprints 546A-N. For example, cognitive analysis module 418 can capture particular messages resonating best with a group and adjust community communication fingerprint 448 to optimize messages for features found in the best resonating messages. Furthermore, cognitive analysis module 418 can create a weighted balance of an influencer's communication re-share fingerprint 546N and community communication fingerprint 448 and adjust the weight of an influencer's communication re-share fingerprints 546A-N to community communication fingerprint 448 based on resonance among the group. For example, cognitive analysis module 418 may assign influencers' communication re-share fingerprints 546A-N a higher percentage weight within community communication fingerprint 448 than that of non-influencer users. This would allow cognitive analysis module 418 to adjust message tailoring based on whether users as a whole or an influencer tend to drive communications within a community.

Cognitive analysis module 418 can further use stored communication information 442 as the basis of a knowledge web to provide for more accurate tailoring of messages over time. Cognitive analysis module 418 can also include analysis features, such as a natural language analyzer and/or a tone analyzer (e.g., IBM's Watson Analytics or Watson Personality Insights (Watson and IBM are trademarks of International Business Machines Corporation)) to determine a style or pattern of communications 532A-N in community messaging system 430, message to be tailored 550, and/or custom-tailored message 552.

Referring now to FIG. 7, in conjunction with FIG. 4 and FIG. 5, an illustrative example will be discussed with reference to a community having an interest in DevOps. Fingerprint module 414 establishes a community fingerprint 448 based on information sources from the 11,764 members of the community, including LinkedIn profile and activities (e.g., profile content, recommendations, post likes, shares, etc.), Twitter accounts (e.g., recent tweets, re-tweets, favorites, profile, list membership, etc.), individual member activity on known DevOps communities blogs, LinkedIn activity within the specific group (DevOps), and company analytics (e.g., Bob Smith works for a consulting company that has a published relationship with ABC Inc.). The established community fingerprint identifies features of the community, as shown in FIG. 7, as well as key influencers, such as John Doe.

Thomas Jones is CEO of a company with a new tool in the DevOps space, called AutoSec. He would like members of the DevOps community to learn about AutoSec as effectively as possible and to gain influence in the DevOps community. Based on the established community fingerprint and identified key influencers, Tom can submit an announcement about AutoSec to message tailoring cloud 400, which can tailor this announcement communication to maximize re-share, click, and/or likes.

For example, message tailoring cloud 400 can identify John Doe as a key influencer and analyze his share fingerprint as a key influencer to target messages to John Doe that he would be most likely to share. More specifically, message tailoring module 416 applies John Doe's tendency to re-share new DevOps tools, information about upcoming conferences, and tweets with mentions of his books, to re-craft messages from Thomas Jones to mention DevOps tools, conferences, and/or Doe's book. For example, Thomas Jones might submit a message originally reading "Take our new AutoSec tool out for a spin!" to message tailoring cloud 400, which can then re-craft the message to read "Take our new AutoSec DevOps tool out for a spin before this year's TechCon!" This latter message is more likely to be re-shared by John Doe, because it matches features of his re-share fingerprint. Message tailoring cloud 400 could also suggest several re-crafted messages based on Doe's key influencer re-share fingerprint and the community fingerprint.

By comparison, message tailoring cloud 400 could instead or also identify Sarah Williams as another key influencer and analyze her share fingerprint as a key influencer to target messages to Williams that she would be most likely to share. For instance, fingerprint module 414 could determine that Williams' share fingerprint indicates that she has a tendency to re-share humorous and positive messages. Therefore, message tailoring module 416 could re-craft Jones' message with a lighthearted, positive tone. For example, the message: "Take our new AutoSec tool out for a spin!" can be re-crafted to read "You'll love taking our new AutoSec DevOps tool out for a spin. We guarantee it!" This latter message is more likely to be re-shared by Sarah Williams, because it matches features of her re-share fingerprint.

Furthermore, as Thomas Jones continues to interact with the DevOps community, cognitive analysis module 418 can continue to refine the community communications fingerprint and re-share fingerprints for the community. This allows Thomas Jones' messages to have increasing resonance and impact within the community.

Figure 8:
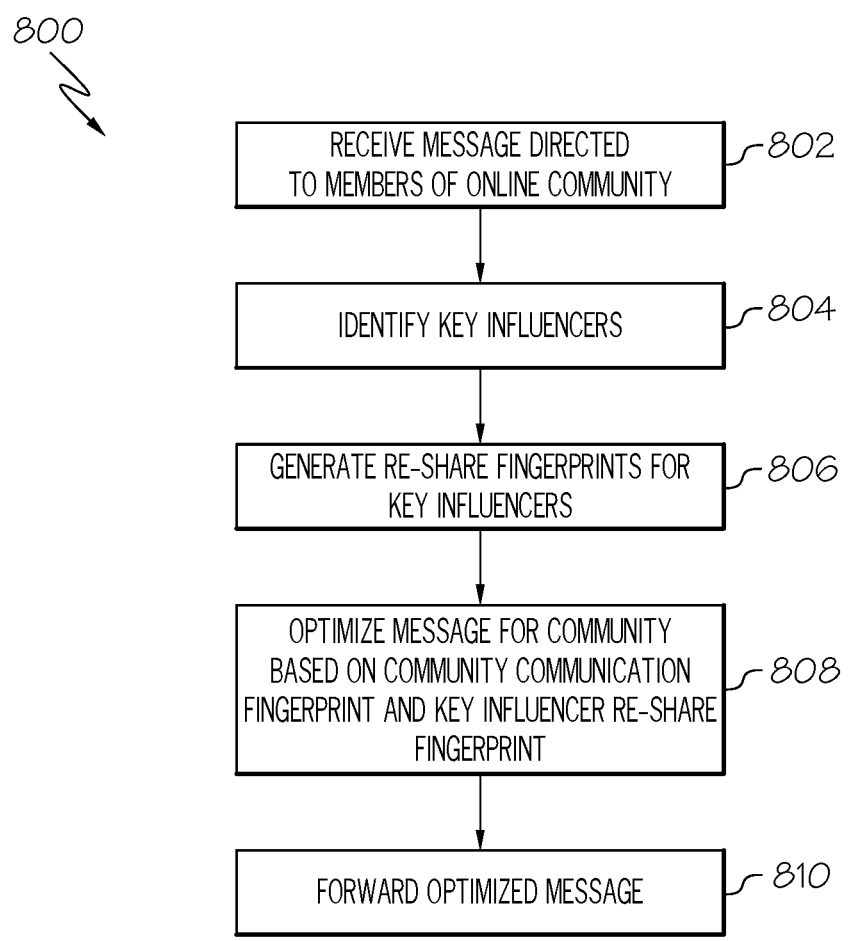
FIG. 8 shows a process flowchart for tailoring messages based on a community fingerprint and key influencers to enhance sharing and resonance of the message according to illustrative embodiments.

As depicted in FIG. 8, in one embodiment, a system (e.g., computer system 12) carries out the methodologies disclosed herein. Shown is a process flowchart 800 for tailoring messages based on a community fingerprint and key influencers to enhance sharing and resonance of the message. At step 802, communication module 412 receives a message 550 directed to members of an online community 430. At step 804, communication module 412 and/or cognitive analysis module 418 identifies a set of key influencers 446A-N based on a node analysis of a plurality of messages 532A-N between the members of the online community, the key influencers 446A-N being members of the online community 430. At step 806, fingerprint module 414 generates a set of re-share fingerprints 546A-N for the set of identified key influencers 446A-N. At step 808, message tailoring module 416 optimizes the received message 550 for a subset of the community 430 that is influenced by a first key influencer 446N of the set of identified key influencers 446A-N based on a community communication fingerprint 448 and a re-share fingerprint 546N of the set of re-share fingerprints 546 for the key influencer 446N of the set of identified key influencers 446A-N. At 810, communication module 412 forwards the optimized message 552 to the subset.

Process flowchart 800 of FIG. 8 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for tailoring messages based on a community fingerprint and key influencers to enhance sharing and resonance of the message. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for tailoring messages based on a community fingerprint and key influencers to enhance sharing and resonance of the message. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to tailor messages based on a community fingerprint and key influencers to enhance sharing and resonance of the message. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for tailoring messages to enhance sharing and resonance based on a community fingerprint and a key influencer, the computer-implemented method comprising:
   receiving a message directed to members of an online community;
   identifying a set of key influencers based on a node analysis of a plurality of messages between the members of the online community, the set of key influencers being members of the online community;
   generating a set of re-share fingerprints for the set of identified key influencers;
   optimizing the received message for at least a subset of the online community that is influenced by at least one key influencer of the set of identified key influencers based on a community communication fingerprint comprising a weighted average of the re-share fingerprint of the at least one key influencer and re-share fingerprints of other members of the online community; and
   forwarding the optimized message to the at least a subset.

2. The computer-implemented method of claim 1, the method further comprising:
   analyzing the plurality of messages between members of the online community to create a plurality of member communication fingerprints, each associated with a member of the online community, based on a pattern and a style of communication of the member; and
   generating a community communication fingerprint from an amalgamation of the plurality of member communication fingerprints.

3. The computer-implemented method of claim 1, wherein the received message is optimized for a feature selected from the group consisting of: resonance, re-sharing, and prompting a desired response in the online community.

4. The computer-implemented method of claim 1, wherein the optimizing further comprises:
   selecting the first key influencer from the set of identified key influencers; and
   weighing the community communication fingerprint against the re-share fingerprint for the first key influencer.

5. The computer-implemented method of claim 1, the optimizing further comprising optimizing the received message for a second subset of the online community that is influenced by a second key influencer of the set of identified key influencers based on the community communication fingerprint and a re-share fingerprint of the set of re-share fingerprints for the second key influencer.

6. The computer-implemented method of claim 1, further comprising modifying the community communication fingerprint based on resonance of the optimized message.

7. The computer-implemented method of claim 1, wherein the community communication fingerprint comprises a communications pattern of the online community, a communications style of the online community, a sentiment of the online community, and an activity of the online community.

8. A computer system for tailoring messages to enhance sharing and resonance based on a community fingerprint and a key influencer, the computer system comprising:
 a memory medium comprising program instructions;
 a bus coupled to the memory medium; and
 a processor, for executing the program instructions, coupled to a message tailoring tool via the bus that when executing the program instructions causes the system to:
  receive a message directed to members of an online community;
  identify a set of key influencers based on a node analysis of a plurality of messages between the members of the online community, the set of key influencers being members of the online community;
  generate a set of re-share fingerprints for the set of identified key influencers;
  optimize the received message for at least a subset of the online community that is influenced by at least one key influencer of the set of identified key influencers based on a community communication fingerprint comprising a weighted average of the re-share fingerprint of the at least one key influencer and re-share fingerprints of other members of the online community; and
  forward the optimized message to the at least a subset.

9. The computer system of claim 8, the instructions further causing the system to:
 analyze the plurality of messages between members of the online community to create a plurality of member communication fingerprints, each associated with a member of the online community, based on a pattern and a style of communication of the member; and
 generate a community communication fingerprint from an amalgamation of the plurality of member communication fingerprints.

10. The computer system of claim 8, wherein the received message is optimized for a feature selected from the group consisting of: resonance, re-sharing, and prompting a desired response in the online community.

11. The computer system of claim 8, the instructions further causing the system to:
 select the first key influencer from the set of identified key influencers; and
 weigh the community communication fingerprint against the re-share fingerprint for the first key influencer.

12. The computer system of claim 8, the instructions further causing the system to optimize the received message for a second subset of the online community that is influenced by a second key influencer of the set of identified key influencers based on the community communication fingerprint and a re-share fingerprint of the set of re-share fingerprints for the second key influencer.

13. The computer system of claim 8, the instructions further causing the system to modify the community communication fingerprint based on resonance of the optimized message.

14. The computer system of claim 8, wherein the community communication fingerprint comprises a communications pattern of the online community, a communications style of the online community, a sentiment of the online community, and an activity of the online community.

15. A computer program product for tailoring messages to enhance sharing and resonance based on a community fingerprint and a key influencer, the computer program product comprising a computer readable storage device, and program instructions stored on the computer readable storage device, to:
 receive a message directed to members of an online community;
 identify a set of key influencers based on a node analysis of a plurality of messages between the members of the online community, the set of key influencers being members of the online community;
 generate a set of re-share fingerprints for the set of identified key influencers;
 optimize the received message for at least a subset of the online community that is influenced by at least one key influencer of the set of identified key influencers based on a community communication fingerprint comprising a weighted average of the re-share fingerprint of the at least one key influencer and re-share fingerprints of other members of the online community; and
 forward the optimized message to the at least a subset.

16. The computer program product of claim 15, the computer readable storage device further comprising instructions to:
 analyze the plurality of messages between members of the online community to create a plurality of member communication fingerprints, each associated with a member of the online community, based on a pattern and a style of communication of the member; and
 generate a community communication fingerprint from an amalgamation of the plurality of member communication fingerprints.

17. The computer program product of claim 15, wherein the received message is optimized for a feature selected from the group consisting of: resonance, re-sharing, and prompting a desired response in the online community.

18. The computer program product of claim 15, the computer readable storage device further comprising instructions to:
 select the first key influencer from the set of identified key influencers; and
 weigh the community communication fingerprint against the re-share fingerprint for the first key influencer.

19. The computer program product of claim 15, the computer readable storage device further comprising instructions to optimize the received message for a second subset of the online community that is influenced by a second key influencer of the set of identified key influencers based on the community communication fingerprint and a re-share fingerprint of the set of re-share fingerprints for the second key influencer.

20. The computer program product of claim 15, the computer readable storage device further comprising instructions to modify the community communication fingerprint based on resonance of the optimized message.

* * * * *